(12) United States Patent
Bergmans et al.

(10) Patent No.: US 7,288,214 B2
(45) Date of Patent: Oct. 30, 2007

(54) COAGULATION SOLUTION FOR CAUSING COAGULATION OF A COLLAGEN

(75) Inventors: Peter Johannes Christoffel Marie Bergmans, Bavel (NL); Antonius Joseph Henricus Aloysius Van Liebergen, Megen (NL)

(73) Assignee: Stork Townsend Inc., Des Moines, IA (US)

( * ) Notice: Subject to any disclaimer, the term of this patent is extended or adjusted under 35 U.S.C. 154(b) by 612 days.

(21) Appl. No.: 10/149,086

(22) PCT Filed: Dec. 5, 2000

(86) PCT No.: PCT/NL00/00898

§ 371 (c)(1),
(2), (4) Date: Oct. 21, 2002

(87) PCT Pub. No.: WO01/41576

PCT Pub. Date: Jun. 14, 2001

(65) Prior Publication Data

US 2003/0134014 A1 Jul. 17, 2003

(30) Foreign Application Priority Data

Dec. 10, 1999 (NL) .................................. 1013817

(51) Int. Cl.
*C09K 3/00* (2006.01)
*A22C 13/00* (2006.01)
*A23L 1/31* (2006.01)
*A23L 1/315* (2006.01)
*A23G 1/00* (2006.01)

(52) U.S. Cl. ...................... 252/194; 426/135; 426/140; 426/277; 426/92

(58) Field of Classification Search ................. 426/140
See application file for complete search history.

(56) References Cited

U.S. PATENT DOCUMENTS

| | | | | | |
|---|---|---|---|---|---|
| 3,071,477 | A | * | 1/1963 | Klevens | 426/59 |
| 3,246,692 | A | * | 4/1966 | Metler et al. | 166/244.1 |
| 3,408,916 | A | * | 11/1968 | Cohly et al. | 426/140 |
| 3,413,130 | A | * | 11/1968 | Rose | 426/277 |
| 3,674,511 | A | * | 7/1972 | Rose et al. | 426/420 |
| 3,682,661 | A | * | 8/1972 | Turbak | 426/138 |
| 3,821,439 | A | * | 6/1974 | Cohly et al. | 426/277 |
| 4,264,632 | A | * | 4/1981 | Rose | 426/247 |
| 5,207,609 | A | * | 5/1993 | Oxley et al. | 452/27 |
| 5,378,469 | A | * | 1/1995 | Kemp et al. | 424/423 |
| 6,013,295 | A | * | 1/2000 | Kobussen et al. | 426/277 |
| 6,054,155 | A | * | 4/2000 | Kobussen et al. | 426/92 |
| 6,153,234 | A | * | 11/2000 | Kobussen et al. | 426/92 |
| 2003/0099758 | A1 | * | 5/2003 | Book et al. | 426/641 |

FOREIGN PATENT DOCUMENTS

EP      0 083 126      * 7/1983
WO     WO93/12660    * 7/1993

* cited by examiner

Primary Examiner—Joseph D. Anthony

(57) ABSTRACT

Described is a coagulation solution suitable for causing coagulation of a collagen-containing casing of a co-extruded food product. This coagulation solution comprises a highly soluble inorganic salt. The pH of the coagulation solution is adjusted using a buffer solution. Also described is a method for coagulating a collagen-containing of a co-extruded food product. This method comprises the step of bringing the collagen casing into contact with a coagulation solution. The coagulation solution herein comprises a solution as described above.

11 Claims, No Drawings

COAGULATION SOLUTION FOR CAUSING COAGULATION OF A COLLAGEN

Coagulation solution suitable for causing coagulation of a collagen-containing casing of a co-extruded food product, as well as a method for coagulating a casino of a co-extruded food product.

The present invention relates to a coagulation solution suitable for coagulating a collagen-containing casing of a co-extruded food product.

Co-extruded food products, for instance sausages, can be produced by simultaneously extruding a meat mass with a layer of collagen gel therearound. This casing of collagen gel is subsequently subjected to a coagulation treatment, wherein a determined degree of coagulation of the collagen casing takes place through the action of a coagulation solution on the casing. Dewatering of the collagen gel substantially takes place during such a coagulation treatment. A known and much used coagulant is a solution of sodium chloride. When a co-extruded food product is brought into contact with such a solution, a partial dewatering of the collagen layer takes place as a result of the osmotic action of the salt.

In the international patent application WO 99/30568 is described a coagulation solution which comprises a highly soluble salt, such as dipotassium phosphate or potassium carbonate. With the use of such salts, dewatering of the collagen gel takes place as a result of osmosis. This dewatering is more complete than that which takes place when sodium chloride is used.

However, since the pH values of the salt solutions which are applied in WO 99/30568 are high—between 8.0 and 12.0—the pH of the collagen casing comes to lie in the alkaline range. This can result in, among other things, variations in the taste of the food product. In this alkaline range the protein in the collagen is also slightly charged, whereby water is bonded and the dewatering resulting from osmosis is partially counteracted. The pH of the coagulation solution during the coagulation treatment is moreover not constant because acids from the collagen gel enter the coagulation solution. In the case where use is made of carbonate slats, foaming of the coagulation solution further occurs, in addition to a loss of salt.

The present invention has for its object to avoid the above stated drawbacks and provides for this purpose a coagulation solution according to the preamble which is characterized in that the coagulation solution comprises a highly soluble inorganic salt and that the pH of the coagulation solution is adjusted using a buffer solution.

An optimal dewatering of the collagen gel is brought about by adjusting the pH of the coagulation solution to a pH between 5.0-7.0—preferably between 5.5-6.0—with a buffer solution suitable for this purpose. A weak acid which is suitable as buffer solution for an inorganic dipotassium phosphate salt is for instance citric acid, lactic acid or acetic acid which is supported by the presence of an organic salt. A base can form a suitable buffer solution for inorganic sodium phosphate salt, for instance sodium hydroxide which is supported by the presence of an organic salt. The pH of the just co-extruded collagen gel is 2-2.5. The isoelectric point of collagen lies at 5.5-6.0. At this isoelectric point the collagen protein is not charged and it has the least water bonding. An optimal dewatering of the collagen gel therefore takes place by bringing the pH to the isoelectric point using the buffer solution.

Using the coagulation solution according to the present invention an optimal dewatering of the collagen gel is thus obtained through both the osmotic action of the highly soluble salts and the pH-influencing action of the buffer solution.

The highly soluble inorganic salt particularly contains a phosphate salt.

By applying such phosphate salts in a coagulation solution co-extruded food products are obtained, the collagen casing of which has the desired mechanical properties and moreover has a good taste.

The highly soluble inorganic salt preferably comprises a sodium phosphate or a potassium phosphate, in particular monosodium phosphate or dipotassium phosphate.

In a preferred embodiment the coagulation solution also comprises a highly soluble organic salt.

Such an organic salt has two functions: it provides for an osmotic action and it also supports the buffering action of the buffer solution. Such a salt moreover has a generally positive taste effect on the food product.

The highly soluble organic salt is advantageously chosen from the group of lactate, citrate and acetate salts, wherein the salt preferably comprises a sodium salt.

Such salts all have the above stated positive action. The above stated salts can furthermore bring about a microbiological effect by inhibiting the growth of micro-organisms and thereby increasing the shelf-life of the co-extruded food product.

In an advantageous embodiment the coagulation solution also comprises a carbohydrate compound, preferably glucose syrup and/or maltodextrin.

Such carbohydrates can fulfill a number of functions in the coagulation solution. The carbohydrates can influence the viscosity of the coagulation solution. The carbohydrates can further bring about an osmotic effect and/or provide adjustment of the taste of the co-extruded food product.

The coagulation solution advantageously also comprises a cross-link compound for a more rapid and/or more complete coagulation.

The so-called mutual cross-linking between the collagen proteins is accelerated by applying such a compound.

The present invention also relates to a method for coagulating a collagen-containing casing of a co-extruded food product, comprising of bringing the collagen casing into contact with a coagulation solution. This method is characterized in that the coagulation solution comprises a solution according to the present invention as set forth in the foregoing.

The invention claimed is:

1. Coagulation solution suitable for causing coagulation of a collagen-containing casing of a co-extruded food product, characterized in that the coagulation solution comprises a coagulation sufficient amount of a highly soluble inorganic phosphate salt and a buffer solution to adjust the pH of the coagulation solution to the isoelectric point of collagen; wherein the pH of the coagulation solution is adjusted to be between 5.5 and 6.0.

2. Coagulation solution as claimed in claim 1, characterized in that the buffer solution for an inorganic dipotassium phosphate salt contains a weak acid, for instance citric acid, lactic acid or acetic acid, which is within the presence of an organic salt.

3. Coagulation solution as claimed in claim 1, characterized in that the buffer solution for an inorganic sodium phosphate salt contains a base, for instance sodium hydroxide, which is supported by the presence of an organic salt.

4. Coagulation solution as claimed in claim 1, characterized in that the highly soluble inorganic salt comprises a sodium phosphate or a potassium phosphate.

5. Coagulation solution as claimed in claim 4, characterized in that the highly soluble inorganic salt comprises monosodium phosphate or dipotassium phosphate.

6. Coagulation solution as claimed in claim 1, characterized in that the coagulation solution also comprises a highly soluble organic salt.

7. Coagulation solution as claimed in claim 6, characterized in that the highly soluble organic salt is chosen from the group of lactate, citrate and acetate compounds.

8. Coagulation solution as claimed in claim 7, characterized in that the highly soluble organic salt comprises a sodium salt.

9. Coagulation solution as claimed in claim 1, characterized in that the coagulation solution also comprises a carbohydrate compound.

10. Coagulation solution as claimed in claim 9, characterized in that the carbohydrate compound comprises glucose syrup and/or maltodextrin.

11. Coagulation solution as claimed in claim 1, characterized in that the coagulation solution comprises a cross-linking compound.

* * * * *